Feb. 28, 1961    A. E. OSBORN    2,973,211
PIPE JOINT
Filed Aug. 2, 1955
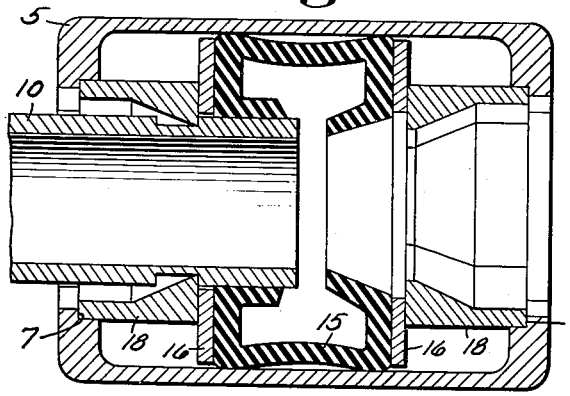
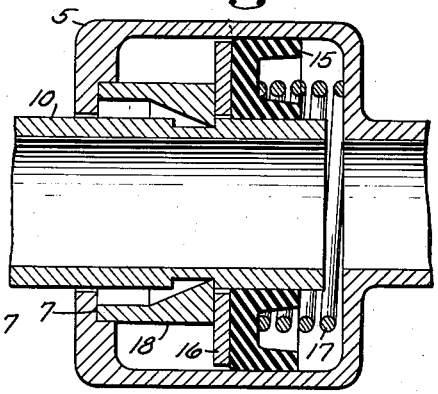
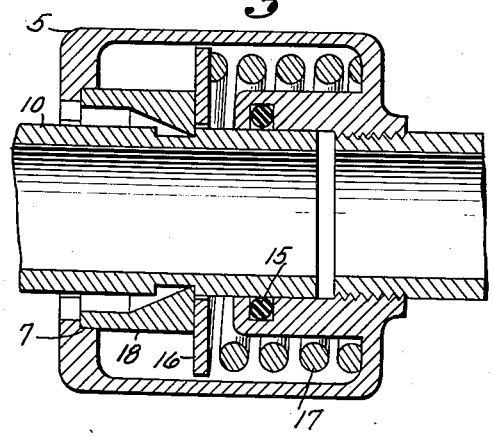
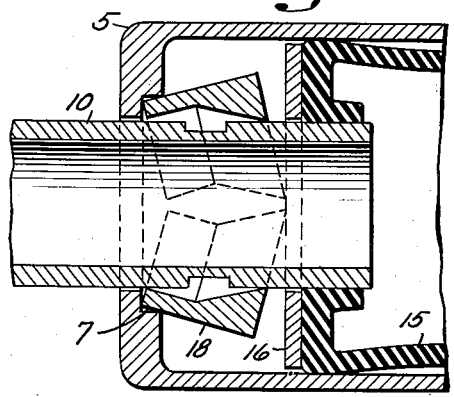
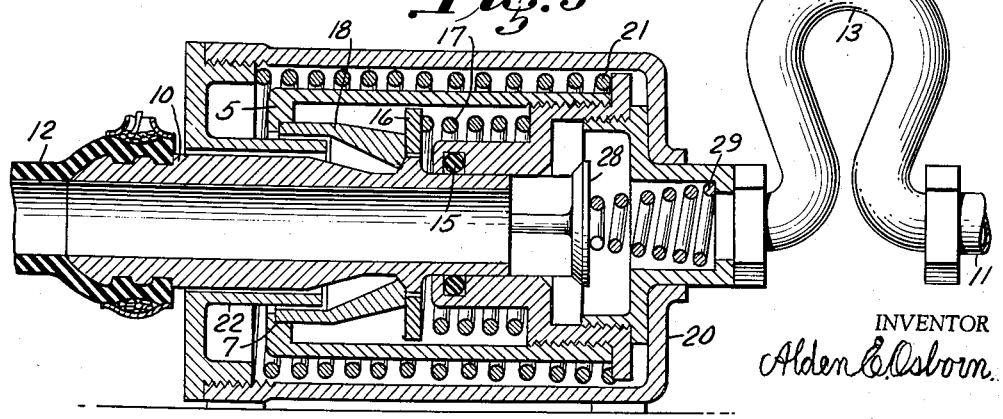
INVENTOR
Alden E. Osborn

2,973,211
PIPE JOINT

Alden E. Osborn, 25 Willard Ave., Mount Vernon, N.Y.

Filed Aug. 2, 1955, Ser. No. 525,874

4 Claims. (Cl. 285—104)

This invention relates to improvements in couplings or joints for connecting pipes, hose, etc., whereby these parts to be connected are securely fastened together by simply pushing one of the parts into a socket of the other part without requiring the use of tools. A special feature of my coupling or joint is the provision for disconnecting the connectible parts by subjecting one of the parts to a relatively small longitudinal pull while, at the same time, they are positively held together when subjected to high internal fluid pressure from within the pipe or hose. Thus, my mechanism can be arranged to allow automatic separation of the connected parts when, for instance, it is used with hose, before the hose is subjected to a pull that would exceed its strength, so that breakage of the hose or other parts is prevented.

In the accompanying drawings:

Fig. 1 illustrates a side elevation of a coupling embodying one form of my invention, Fig. 2 represents a sectional elevation of a bell joint embodying a modification of the coupling joint of Fig. 1, Fig. 3 represents a sectional elevation of the modfication of the joint of Fig. 2, Fig. 4 represents a partial sectional elevation of Fig. 1, showing the position of the retaining segments while the pipe is being inserted, and Fig. 5 represents a sectional elevation of a modification of the coupling shown in Fig. 3, with an associated means for releasing the parts held together by the coupling mechanism, and with a valve means for automatically closing the passage of one of the coupled parts.

In Fig. 1 a coupling for connecting two collared pipes (with the collar formed by utilizing one side of a pipe groove) is illustrated with a pipe 10 in position at one end and a pipe omitted from the other end in order to show the position of the coupling parts before the pipe is inserted. The coupling comprises a main or socket member 5, two segmental lock rings 18, two washers 16, and a gasket 15. The coupling, as thus described, seems to resemble the coupling shown in my Patent No. 2,479,960, of August 23, 1949. However, there is an improvement incorporated in the present device, in that the lock-ring segments pivot on the coupling body or socket member and, therefore, a more efficient lock ring action is obtained. This comprises forming a shoulder 7 on the inwardly extending flange of the socket member, which shoulder fits about the outer surface of the lock ring segments at the outer end thereof, so that, when the rings are expanded by the large diameter of the pipes adjacent to the collars, the segments are caused to tilt because their outer ends are held from expansion, with the result that their tilting causes the washers 16 to be forcibly pressed against the gasket 15 and compress it longitudinally. Thus the longitudinal movement of the washers and compression of the gasket is proportioned to the lift of the collar-engaging ends of the segments, to the length of the segments, to the number thereof, and to the distance the point of contact of the segment and washer is inside of the point of pivoting of the segments against the shoulder 7 of the socket member flanges. (The position of the segments, when expanded by the pipe end, is shown in Fig. 4.) The variation in the longitudinal or spring pressure of the gasket or other elastic element can also be compensated for by changing the relation of the contact point between the lock ring and washer and the shoulder 7 of the socket member flange. In this view of my invention the gasket is shown as having a very stiff center section to keep the ends of the gasket from coming together when the pipes are being inserted, so that, in this case the lock rings' point of contact with the washer and with the shoulder of the socket member should be quite close to being in line in order to provide that the resistance to inserting the pipe is not excessive in spite of the relatively great gasket pressure. As shown in Fig. 1, the end flanges of the socket member are provided with keyways, such as are illustrated in my aforesaid Patent No. 2,479,960, through which a lock ring-lifting tool can be inserted to raise the lock ring and release the pipe.

The modification of the coupling of Fig. 1 shown in Fig. 2, is illustrated as a bell end joint for pipe or as a joint at one end of a coupling. It comprises a socket member or pipe end 5, a gasket 15, a washer 16, a segmental lock ring 18, and a spring 17. The gasket 15 is free to slide on both the pipe 10 and the socket member 5 as, in this form, it does not constitute the elastic element to exert longitudinal pressure on the washer 16, as the spring 17 forms the pressure means, while the gasket 15 prevents leakage. The segmental lock ring 18 is pivoted against a shoulder 7 on the end flange of the socket member 5 and operates in the same way as does the lock rings of the form shown in Fig. 1. As in Fig. 1, pressure of the material within the pipe 10 increases the longitudinal pressure on the washer 16 and contracts the lock ring 18 more tightly into the pipe groove or against the pipe adjacent to the pipe collar. This construction, embodying a spring 17, can obviously be inserted into the coupling of Fig. 1 by placing a spring inside of the gasket 15, or between two separated gaskets, if they are used in place of the single gasket shown therein.

In Fig. 3 is shown a further modification which, like Fig. 2, involves an elastic element to longitudinally move the washer 16 that comprises a spring 17 in place of using the gasket for the same purpose. In this figure the gasket 15 is in a groove in the socket member 5 separated from the spring means 17, the washer 16, and the lock ring 18, and therefore pressure obtained from the material within the pipe has no effect on the lock ring-contraction pressure. The gasket 15 is not as flexible as is the form illustrated in Figs. 1 and 2, and is, therefore, not as well suited for use in pipe couplings and joints (because of variations of ordinary pipe sizes), but can be used in coupling devices where the parts fitting into the gasket can easily be held within quite accurate size limits. The action of the washers, springs, and segmental lock rings in retaining the pipes or center members in place is the same as in other forms of my device.

Fig. 4, as hereinbefore stated, shows the position that the lock ring segments and washers assume when they are expanded by the outside of the pipe or center member collar while the pipe or member is being inserted into the socket member.

Fig. 5 shows a quick-connected coupling mechanism operating on the lines of my coupling device shown in Figs. 1 to 4, with a releasing device that provides for the separation of the coupling-connected parts upon a longitudinal pull being exerted on one of said parts. The device of Fig. 5 is also shown as including a check valve 28 and spring 29 whereby, when the connectible parts are separated, fluid is prevented from escaping from one of the parts. This valve device is not, however, essential to the operation of the coupling or releasing mechanism shown in this figure and it should be understood that the valve mechanism can be omitted or can be modified to operate on both the inlet and exhaust passages of the device, as is sometimes desirable with quickly-connected couplers, in order to prevent loss of fluid from both inlet and outlet passages when they are separated.

The coupling mechanism comprises a segmental lock ring 18 that engages a collar on the center member 10, a longitudinally slidable washer 16, a spring 17, and a casing 5, corresponding to the coupling or socket member 5 of the other figures. The action of the lock mechanism is exactly the same as hereinbefore described and the releasing is accomplished by pushing a sleeve 22 into the lock ring 18, with this sleeve forming a part of the special mechanism hereinafter described, instead of being the special separable tool used with the Figs. 1 to 4 forms of my device. However, as shown in Fig. 5, the sleeve 22, corresponding to the releasing tool, is pressed into the lock ring 18, by moving the lock ring over the sleeve instead of moving the tool into the lock ring. This is accomplished by providing that the casing 5, with the lock rings and internal parts, can slide longitudinally in a stationarily mounted outer casing 20, a sufficient distance to cause the sleeve 22 to enter the lock ring 18 and lift it to disengage the detachable center member 10 so that the member is released. The casing 5 and internal parts are normally held in position to disengage the sleeve 22 from the lock ring 18, by a spring 21 so that, when the center member 10 is pushed into a socket member or casing it would normally be held in place by the action of the lock ring 18. If, however, a longitudinal pull is exerted on the center member (the extent of which would be determined by the strength of the spring 21), the casing 5 and interior parts would be moved, and if that movement were sufficient, the sleeve 22 would lift the lock ring 18 and release the center member 10. Thus, a longitudinal pull on the center member or parts connected thereto would allow the separation of the member and associated parts and, by having the spring 21 of the proper strength, it is possible to insure that the center member would be firmly held in position, but would release before the pull on the parts would be sufficient to cause breakage or damage. As the casing 5 and associated parts must be permitted to move a short distance, the inlet connection thereto must allow said movement, and therefore, a looped or curved pipe 13 is shown in Fig. 5 to permit of the necessary flexibility. If desired, a hose or other device that allows the longitudinal movement of the internal parts while maintaining a fluid-tight connection can be used instead of the looped pipe. The automatic valve device shown in Fig. 5 comprises a valve 28 which is seated against a surface on a part of the member 5 by means of a spring 29 when the center member 10 is out of the member 5, but which is opened by the end of the center member, after this member end is passed through the gasket 15, so that fluid from the pipe 11 can pass through the coupling and into the pipe or hose 12.

It will be noted that, because of the swinging of the lock ring segments about the pivoting point 7 on the casing 5, the ends of the segments might be difficult to disengage from the member 10 collar if the face of the collar were at right angles to the center line of the device, and I have, therefore shown, in Fig. 5, the member collar with a slanting surface against which the segment ends bear. By changing the angle of this surface variations in the force required to disengage the lock rings can be provided for.

I claim:

1. Means for connecting a circumferentially collared member to an internally channeled socket member adapted to surround an end portion of said collared member, comprising a lock means inside of said socket of said socket member, composed of separate segments, with each said segment having an end thereof held from outward radial movement by a shoulder inside of said socket and with the inner end of each said segment movable radially outward by the pivoting of said segment against said shoulder, an elastic means within said socket for contracting said lock means by resisting the longitudinal displacement of said inner end of said lock ring segments, with said lock means, when so contracted, bearing against said collared member at the back of the collar thereon, and a gasket means to prevent leakage between said collared member and said socket member.

2. A means for connecting a separable member having a circumferential collar thereon to a longitudinally movable internally channeled socket member adapted to surround an end portion of said collared member, comprising a lock means and a contracting means therefor inside the socket of said socket member, with said lock means, when contracted by said contracting means, fitting said collared member adjacent to said collar to retain said collared member in said socket member and being expandable to permit said collar of said collared member to pass therethrough whereby said collared member can be disconnected from said socket member, means to cause the said expansion of said lock means comprising a stationary member having an inwardly extending sleeve adapted to enter said lock means when said collared member, said socket member and said lock means are moved longitudinally to engage said sleeve with said lock means, and a spring means to normally resist the longitudinal movement but to permit said movement when a longitudinal pull is exerted on said collared member to overcome the resistance of said spring means.

3. A means for connecting a circumferentially collared member to an internally channeled socket member adapted to surround an end portion of said collared member, comprising a lock means composed of separate segments inside of said socket of said socket member, with each said segment having an outer end thereof held from outward radial movement by a shoulder inside of said socket and with the other end of each said segment movable radially inward or outward by the pivoting of said segment against said shoulder whereby, when said radially movable end of each said segment is moved inward to bring said end closer to the ends of the adjacent segments, said lock means in contracted in diameter against said collared member back of the collar thereon, and an elastic means within said socket for causing said contraction of said lock means by said elastic means resisting the longitudinal displacement of the inner end of each of said lock ring segments.

4. A means for connecting a separable hollow circumferentially collared member to an internally channeled socket member adapted to surround an end portion of said separable member with the collar thereon within said socket, comprising an internal flange at the end of said socket with a circumferential shoulder on the inner side thereof of larger diameter than the diameter of said circumferential collar of said separable member, a segmental lock ring in said socket and having an outer surface adjacent to the outer end of each segment engaging said circumferential flange shoulder to prevent the outward radial movement of said end of said segments, an elastic element in said socket, a washer in said socket between said elastic segment and the inner end of said lock ring segments with said elastic element exerting a pressure to longitudinally move said washer whereby said washer is pressed against said inner end of said lock ring segments on a line inside of the radius of the bearing of said segments on said circumferential flange shoulder to thereby cause the inward radial movement of said segment ends and the contraction of said lock ring at the back of said collar of said member.

(References on following page)

References Cited in the file of this patent

UNITED STATES PATENTS

| | | |
|---|---|---|
| 1,509,651 | Iftiger | Sept. 23, 1934 |
| 2,092,116 | Hansen | Sept. 7, 1937 |
| 2,478,052 | Palm | Aug. 2, 1949 |
| 2,479,960 | Osborn | Aug. 23, 1949 |
| 2,536,702 | Scheiwer | Jan. 2, 1951 |
| 2,619,367 | Hanson | Nov. 25, 1952 |
| 2,631,872 | Wurmser | Mar. 17, 1953 |
| 2,666,656 | Bruning | Jan. 19, 1954 |
| 2,727,759 | Elliott | Dec. 20, 1955 |
| 2,777,716 | Gray | Jan. 15, 1957 |